May 4, 1926.

E. T. FERNGREN 1,583,541

FORMING CONTINUOUS SHEET GLASS

Filed Feb. 25, 1924

INVENTOR.
Enoch T. Ferngren.

C. A. Rowley
ATTORNEY

Patented May 4, 1926.

1,583,541

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

FORMING CONTINUOUS SHEET GLASS.

Application filed February 25, 1924. Serial No. 694,930.

*To all whom it may concern:*

Be it known that I, ENOCH T. FERNGREN, a citizen of Sweden, residing at Toledo, in the county of Lucas and State of Ohio, have invented new and useful Improvements in Forming Continuous Sheet Glass, of which the following is a specification.

This invention relates to improvements in the art of producing sheet glass and more particularly to an improved process and apparatus for flowing glass downwardly over a plurality of directing and supporting members from which the molten glass is drawn away in sheet form.

In drawing a sheet of glass downwardly from a supplying flow, which is retarded in its vertical descent by the walls of the slotted orifice, or by the walls of a clay slab around which the supplying flow is spread, streaks or striations are apt to develop in the glass sheet, as well as a multitude of fine lines running in the direction in which the sheet is drawn. The clay parts over which the glass is drawn will gradually dissolve and crumble under the chemical action and the drawing strain, and the material pulled away from these parts will be drawn into the sheet.

When drawing through a slotted orifice, the glass clinging to the clay walls picks up alloy and additional silica which tends to produce an exceedingly tough glass adjacent to the clay wall of the orifice, which glass will be pulled downwardly along the side walls of the orifice and cause striations in the surface layer of the sheet. When the sheet is drawn from a supplying flow which descends along the exterior of a clay slab, the same phenomena will develop but not to such a marked degree, since the stress lines within the glass formed by the pull on the submerged glass adjacent the clay surface will be covered by the exterior glass flowing thereover, and will not always be communicated to the surface glass of the sheet. It may be seen in both instances cited that the injury done to the glass sheet is caused by transmission of drawing force to that glass which is more intimately associated with or clings to the clay members over which the glass passes.

According to the present invention, the molten glass flows from a container onto and successively around a series of directing or supporting members positioned in spaced relation one above another. In the form here shown, two such members are arranged in superposed relation, and the molten glass after flowing around both sides of the upper member reunites into a single stream which is delivered to the upper surface of the lower member. This lower member is preferably formed of a suitable metal, such as an alloy of nickel or tungsten, which when covered by the glass stream, will be practically indestructible, and from the surface of which the sheet supplying stream will not absorb, dissolve, or carry off any noticeable amount of oxide or metallic material, and along the surface of which there will be less adhesion of the glass stream. The molten glass flows as in the first instance around both sides of this lower directing member, the two streams uniting at the lower edge of the member and flowing or being drawn downwardly therefrom in sheet form.

Means are provided to individually support the two directing members in adjustable relation with respect to each other and to the source of molten glass, and the directing members are surrounded by suitable means for regulating the temperature of the glass as it passes downwardly therearound prior to the formation of the sheet.

The invention will be more clearly understood from the following detailed description of certain forms of apparatus involving the principles of this invention.

Figure 1:
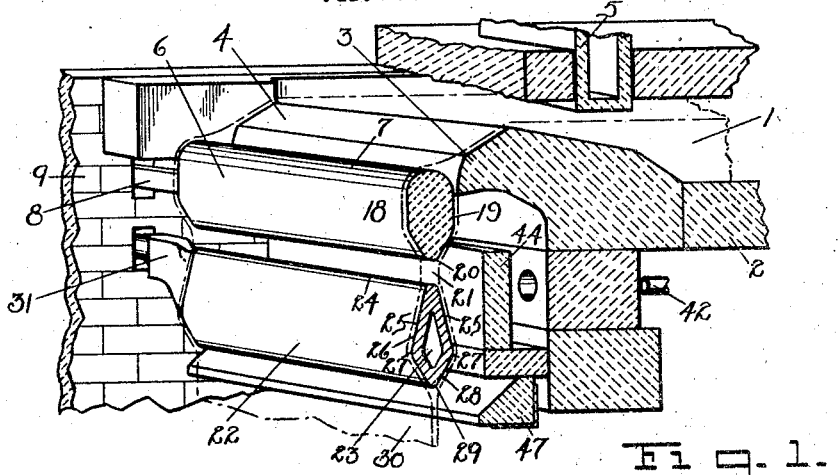
Fig. 1 is a perspective view, parts being broken away, and the forward portion of the apparatus being shown in longitudinal vertical section.
Figure 2:
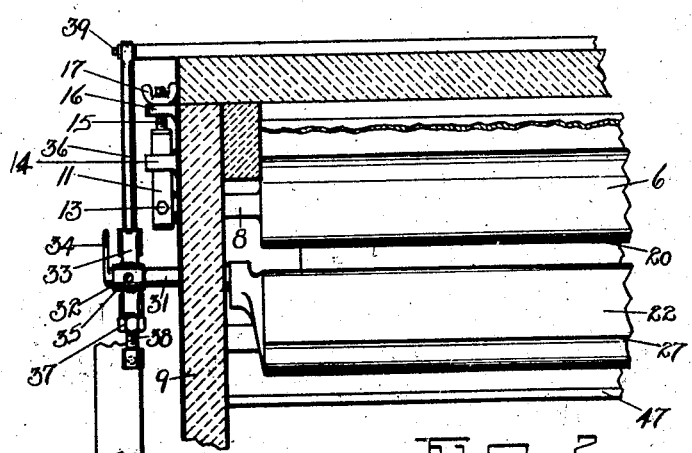
Fig. 2 is an elevation of one end of the directing members and the adjusting and supporting means therefor.
Figure 3:
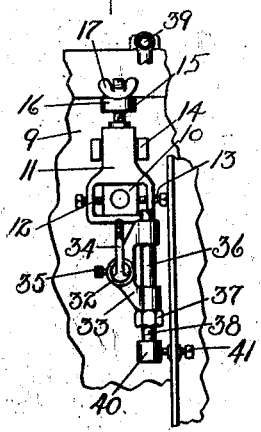
Fig. 3 is an elevation of the adjusting mechanism looking from the left at Fig. 2.

A body of molten glass indicated at 1 is maintained in the extension 2 of a tank or other receptacle, and the glass level will be such that the glass tends to constantly overflow the lip 3 at the front end of the receptacle in the form of a thin stream 4. The depth or volume of this overflow stream 4 may be regulated as desired by any suitable gate or valve, preferably located back of the extension 2 of the tank, and not here shown. At 5 is indicated a vertically adjustable cooler, or hollow shield, through which a supply of air or other cooling fluid may be passed. By moving this cooled shield closer to or further from the surface of the molten glass 1, the temperature and plastic condition of the flowing stream 4 may be regulated.

The transverse slab or directing member 6 is adjustably positioned in front of and slightly below the overflow lip 3, as indicated in the drawings, so that the stream 4 passing over this lip will be caught upon the rounded upper surface 7 of this slab. This member may be made of clay or other refractory material, or may be formed of a metallic alloy like the lower member to be described hereinafter.

At each end of the member 6, a supporting bar 8 passes out through an opening in the side wall 9 of the enclosing structure, and is supported in a bearing 10 laterally adjustable in a supporting bracket by means of set-screws 12 and 13 at the two sides thereof. The bracket 11 is slidable vertically between guides 14, and is supported by the screw-bolt 15 passing through the fixed eye 16 and having adjusting nut 17 on the upper portion thereof. By suitably manipulating the adjusting means just described, the directing member 6 may be raised or lowered, and moved toward or from the lip 3. In this way the molten glass 4 which is received upon the upper portion 7 of the directing member may be distributed as desired between the front and back faces of the member down which it flows in the form of thin streams 18 and 19, which flow down the inwardly tapering lower sides of the member to unit at the lower edge 20 in the form of a single thick stream 21.

This directing member 6 acts as a supporting and distributing member for the downwardly flowing glass and functions to deliver a wide even stream of molten glass to the upper receiving edge of the lower directing member 22. This short downwardly flowing stream of glass 21 between the two directing members has both faces exposed to the heated gases within the enclosing chamber, thus facilitating the temperature control of the glass delivered to the lower directing member 22.

The main lower directing member 22 will be formed of a suitable heat-resisting metal, preferably an alloy of nickel and tungsten, or some similar material. This metallic member will normally be completely surrounded by the molten glass, so that there is no appreciable exposure to the atmosphere, and there will be practically no oxidation or chemical destruction of the metallic surfaces. Preferably, this member is made hollow as at 23 to reduce the weight, and if found necessary heating means may be employed within this space 23.

The stream of molten glass 21 is received upon the upper edge 24 of member 22, which splits the stream into two thin streams 25 which flow down the rather long, gradually diverging side faces 26 of the member. These faces 26 extend down to the outer corners or ledges 27, from which the side walls slope rather sharply inward as at 28 until they meet at the lower edge 29 of the slab. The molten streams 25 will adhere to and flow slowly down the rather large supporting areas of faces 26, but after rounding the ledges 27 will be drawn down more rapidly along the lower converging walls 28 of the member until the glass streams unite at the lower edge 29 and are drawn downwardly therefrom in the form of glass sheet 30.

The supporting rods or shafts 31 which extend out through the side walls 9 of the enclosing structure are rotatably mounted in bearings 32 in the supporting bracket 33. By suitable manipulation of the crank handle 34, member 22 may be tilted as desired with respect to the vertical plane, and may be fixed in any adjusted position by the set-screw 35. Bracket 33 is slidable vertically along a guide rod 36 and is held in adjusted position thereon by the nut 37 which screws upon a threaded portion 38 of the rod. Rod 36 is pivotally hung at its upper end on pin 39, and its lower end 40 may be swung to the desired adjusted position by means of screw 41. By means of the adjusting apparatus just described, member 22 may be raised or lowered, moved laterally, or inclined to the vertical as desired. In this way it may be properly positioned below the upper member 6 which feeds the molten glass thereto, so that the streams 25 flowing down the two faces of the member will have an equal volume and velocity.

The two directing members are completely enclosed within a chamber which is heated by any suitable arrangement of burners such as indicated at 42 and 43. Preferably, the lower slab 22 is protected from the direct action of the heaters by the vertically adjustable side slabs or partitions 44 and 45, which will radiate an even moderated heat against the streams 25 flowing down this directing member. These partitions 44 and 45 will, as positioned, direct a greater portion of the heat against the streams of molten glass flowing downwardly from lip 3 onto and around the upper distributing and directing member 6.

The lowermost surface portions of the flowing glass streams, which pass down the lower sides 28 of member 22 to unite at lower edge 29 and be drawn away in sheet form, are normally given more or less plasticity by the amount of cooling atmosphere which is permitted to pass up through slot 46 at the bottom of the chamber. The rather narrow passages between the ledges 27 and the partitions 44 and 45, as shown, serve to partially cut off the relatively cooler lower portion of the heating chamber from the hotter upper portion. However, if the partitions are raised so as to provide a direct passage for heated gases from the burners 42 and 43 to the ledges 27, the fluency of the glass at these points may be increased. The tiles or slabs 47, which are adjustable laterally at the lower end of the enclosing structure, adjacent the sides of sheet 30, serve to vary the width of the exit slot 46 and to thereby regulate the amount of heat retained in this lower portion of the chamber.

Figure 4:
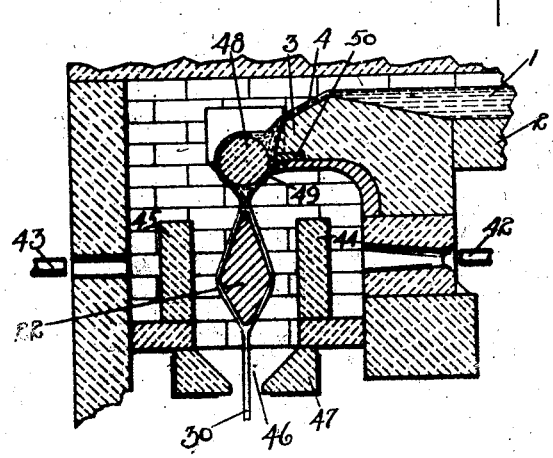
Fig. 4 is a vertical section through a modified form of the apparatus.

In the modification shown in Fig. 4, the uppermost directing member is in the form of a cylindrical roller 48. If desired this roller may be rotated, preferably in the direction of the arrow as shown. This rotation of the roller will assist the inner stream of glass 49 in its movement between the roller and the adjacent face of overflow lip 3. As shown in Fig. 4, lip 3 is formed with a metallic edge-plate 50 at the point where the flow 49 leaves the lip, to avoid the destructive crumbling away of the clay part at this edge and consequent injurious effects upon the glass sheet.

Either form of upper directing member as described, will deliver the molten glass to the lower member in an even vertical stream. The upper member also acts as a partial support for this stream, thereby decreasing the velocity of flow with which it is delivered to the upper edge 24 of the lower directing member. The molten glass streams do not have as great adhesion with the smooth surfaces of the lower metallic member, but the comparatively long diverging upper faces of this member offer an increased clinging area which offsets the weaker adhesive properties. As stated above, there will be practically no physical wear or chemical deterioration of the metallic supporting member, and consequently no injurious effects will be imparted to the glass streams flowing thereover.

The amalgamation with or the adsorption by the surface glass of the streams, of atomic matter from the combusting atmosphere of the heating space and the slight surface cooling of the glass streams 28 flowing down the converging lower surfaces of member 22 below the ledges 27, will form a superficial skin of greater inherent cohesiveness on these streams, which assumes the greater part of the drawing stress. This tractive force operating through the drawn glass converging below the ledges 27 is communicated to each surface of the streams 25 on the upwardly tapering portion of member 22. This pull on the superficial layer of the surface glass tends to draw it in advance of the remainder of the flow and at a greater speed toward the outermost ledges 27.

As these exterior superficial surface films of glass come under drawing stress and attain a progressive acceleration in the line of draw, before the main body of the slower flowing layer of glass received such impulse, these films are caused to move downward at a much faster rate than the rest of the glass, progressively accelerating the advance of the adjacent glass or that surface glass which is subadjacent to the more cohesive superficial surface, so that at the wider reach of the spread flow a certain proportion thereof also becomes considerably accelerated and moves along with the surface layers as they are bending inward toward one another around the laterally projecting side promontories or ledges 27 on the member 22.

The drawing force thus operating on the flared-out portion of the forked flow will speed the downward movement of only a relatively small portion of the flow because of the somewhat dynamic concentric pressure exerted by the more cohesively knitted and tensioned surface films against the more fluid glass of the enfolding or forked flow, which pressure tends to urge this glass inward and upwardly of the upward tapering portion of the member 22, and thereby exerts a sort of an upward squeezing effect on the body of the flow and also magnifies the support given to this glass by each slanting side of the upward taper of the member 22, which altogether in practical effect will enhance the internal support given, and balance the action of gravity on a portion of the glass moving down along each side of the upward taper of the member 22.

In the glass flow thus accelerated and retarded, there will be no occasion for the drawing stress to reach through the flow to the member 6 and thereby drag on the interior surface glass clinging to the faces of this member, and while the flow divided during its descent by the wedge member 22 comes under the influence of the tractive force while traversing the wedge, and is accelerated; the real attenuating stress and stretching action, where the glass movement is resisted by a clinging surface on its inner sides, takes place along the lower taper 28 of the member 22, and mainly below the points 27.

Above the ledges 27, there is a progressively but relatively slow speeding up of the downward glass flow, but below these ledges there is a swifter progressive increase in speed resulting in an immediate sheet formation in which there may thereafter be but very little further stretching if proper support is given to the drawn sheet.

The sheet of glass may be formed beneath the member 22 without any material resistance from the surface of the lower taper 28 of the member 22, if the two glass streams flowing from the ledges 27 to the point 29 are maintained in relatively freely flowing state and the streams at the same time are kept relatively thin by being reduced in quantity.

The single streams of glass thus forming at the edge point 29 and departing therefrom, will hang as a suspended sheet area through the slot 46, the weight of the sheet area formed acting to stretch the stream to proper sheet thickness.

When the sheet is formed in this manner no drawing force is required, the requirement in this instance being that the sheet be supported and taken away as it is formed. The glass sheet formed in this way will become plastically stable as it emerges through the slot 46 and should preferably be turned and carried horizontally through the leer where it is gradually cooled and then delivered to the cutting table.

In order to maintain the glass streams in a highly fluent state as they form the single stream at point 29, the tiles 47 should be about as shown in Fig. 1, and the tiles 44 and 45 elevated to a higher position.

Claims:

1. The process of producing sheet glass, consisting in producing a plurality of streams of molten glass, uniting the streams to produce a single stream, then dividing the stream into a plurality of streams, after which they may again be united into sheet form.

2. In the art of making sheet glass, that step in the formation of a continuous sheet of glass which consists in advancing the glass which is to compose the sheet in stream formation alternately in plural and in single streams tandem fashion through a heated zone toward the point of exit from the zone, and forming the sheet from the foremost single stream by quickening its movement while progressively solidifying its body below said point.

3. The method of producing a continuous sheet of glass which consists in flowing molten glass downwardly in shallow layers over a plurality of spaced rigid clinging surfaces positioned at successive points in its path of advance, and producing the sheet by stretching acceleration of the flowing glass as it traverses and departs from that clinging surface which is positioned at the lowest point in its vertical path.

4. The method of producing a continuous sheet of glass which consists in flowing a shallow stream of glass downwardly from a supply, in cascading the glass of said stream over the opposite sides of guiding members positioned in the same vertical plane and spaced from one another, and in forming the sheet by accelerating the advance of the glass of the stream as it arrives at the lower end of the lower guiding member.

5. The method of producing a continuous sheet of glass which consists in flowing a shallow stream of glass downwardly from a supply, in cascading the glass of said stream over the opposite sides of guiding members positioned in the same vertical plane and spaced from one another, and in forming the sheet by causing constant stretching force to operate on the glass of the stream as it arrives at the lower end of the lower guiding member and during said progression of the glass stream heating the opposite sides thereof.

6. The process of producing sheet glass, consisting in producing a plurality of streams of molten glass, then passing the streams over the opposite sides of spaced guide members, one stream on each side thereof, and then uniting the streams into sheet form.

7. The method of drawing a sheet of glass which consists in advancing the glass from which the sheet is drawn, through a heated space in film flows over the opposite sides of a flow guiding member, in uniting the said films into a single depending flow formation beneath said member, in spreading the glass of said formation over the opposite sides of a flow supporting member and advancing it downwardly thereover toward a point of confluence therebeneath as separated film flows and forming the sheet by applying drawing force to the said flows at their point of confluence, while reducing their surface temperature.

8. In the art of making sheet glass, the method of handling the glass before forming the sheet which consists in delivering the glass originally as a relatively wide and shallow flow toward and over the exterior of a horizontally positioned member in a manner to divide the glass into two shallower flows proceeding downwardly on said member, in uniting said flows into a single flow beneath said member, and thereafter in again dividing and reuniting the said single flow in a similar fashion prior to the application of drawing force thereto.

9. In the art of making sheet glass, the method of handling the glass before forming the sheet which consists in delivering the glass originally as a relatively wide and shallow flow toward and over the exterior of a horizontally positioned member in a manner to divide the glass into two shallower flows proceeding downwardly on said member, in uniting said flows beneath said member, in again dividing and reuniting the flowing glass in a similar fashion prior to the application of drawing force thereto, and in exposing the opposite surface areas of said flow to the influence of heat while in transit to the point of sheet formation.

10. In the art of making sheet glass, the method of handling and treating the glass which consists in delivering the same as a relatively shallow flow of wide extent from a supply over the exterior of two horizontally extending flow supporting members which are positioned one above the other in a manner to first divide and thereafter reunite the flow in succession at and below each member, and in producing the sheet by tractive acceleration of the flow movement at the lower end of the lower flow supporting member.

11. The method of producing sheet glass which consists in advancing the glass supply for the sheet as relatively thin film flows over the exterior surfaces of separately spaced guiding members which are positioned one below the other, in uniting the said flows in the space between the said members and at the lower point of the lower member, in heating the flowing films in a manner to maintain their fluid mobility toward the lower point of the lower member, and in causing a loss of heat from the exterior of the films uniting at the lower end of said member while applying drawing force to accelerate the movement of the films as they unite to form a sheet area beneath said member.

12. The step in the process of producing sheet glass, consisting in producing a plurality of streams of glass, then passing the streams over the opposite sides of spaced guide members, one stream on each side thereof, the streams uniting between the guide members.

13. In the art of making sheet glass, the method which consists in delivering molten glass over the exterior of a horizontally extended member, in a manner to first divide the glass into two separated flows and thereafter reunite the same into a single flow beneath said member, and in again dividing and reuniting said flow at a predetermined point beneath the said member with another horizontally extending member, and foming the sheet area by flowing the glass in a thin film from the lower member and by constantly removing said film as it is being formed.

14. In the art of making sheet glass, the method which consists in advancing a shallow flow of molten glass from a supply, in intercepting said flow at a predetermined point in its path of advance and causing the same to become divided and thereafter united and in again intercepting, dividing, and reuniting said flow while communicating drawing force to the divided flows as they are reuniting.

15. In the art of making sheet glass, the process which consists in causing a shallow overflow of glass from a supply toward a point of vertical descent, in intercepting the glass at said point with a rigid member in a manner to first form a divided and thereafter a reuniting stream flow during the early descent of the glass, in intercepting the descending stream beneath said member with a rigid metallic part having upwardly and downwardly converging side areas to thereby divide and reunite the flow a second time, and forming the sheet by drawing glass of predetermined thickness from the reuniting glass flows at the lower end of the metallic member.

16. The step in the process of producing sheet glass, consisting in producing a plurality of streams of glass, then passing the streams over the opposite sides of spaced guide members, one stream on each side thereof, the streams uniting between the guide members and separating over the next lower guide member.

17. The process of producing sheet glass, consisting in producing a plurality of streams of glass, then passing the streams over the opposite sides of spaced guide members, one stream on each side thereof, the streams flowing down the sides of the guide members and uniting at the bottom of each of said members.

18. The process of producing sheet glass, consisting in producing a plurality of streams of glass, then passing the streams over the opposite sides of spaced guide members, one stream on each side thereof, the streams flowing down the sides of the guide members and uniting at the bottom of each of said members, the streams being removed from the last guide member in united sheet form.

19. In the art of making sheet glass, the method of forming a sheet, which consists in delivering a shallow and wide flow of molten glass from a supply over the exterior of a horizontal rigid member in a manner to first divide the flow and thereafter reunite the same, and in again dividing and reuniting said flow at a predetermined point beneath said member prior to the drawing of the sheet with a rigid part shaped to present to the glass flow upwardly and downwardly tapering body portions having converging surface areas.

20. In the art of making sheet glass, the method of forming a sheet which consists in delivering a wide flow of molten glass from a supply over the exterior of a rigid member in a manner to first divide the flow and thereafter reunite the same below said member, and in again dividing and reuniting the flow at a predetermined point beneath said member by introducing a horizontally extending metallic part in the path of descent of the previously united glass flow, prior to the application of drawing force thereto.

21. In the art of making sheet glass, the step in forming a sheet which consists in delivering a wide flow of molten glass from a supply over the exterior of a horizontally mounted rigid member in a manner to first divide the flow and thereafter reunite the same and in causing a second division and reuniting of said flow at a point beneath said member by introducing in its path a horizontally extending metallic part having a downwardly pointing wedge-shaped body.

22. In the art of making a continuous sheet of glass, the step in forming the sheet which consists in delivering a shallow and wide flow of molten glass over the exterior of a horizontally extending member in a manner to first divide the flow and thereafter reunite the same, and in again dividing and reuniting said flow at a predetermined point beneath said member by introducing a horizontally extending metallic part having an upwardly and downwardly tapering body formation along its entire horizontal extent in the path of descent of the glass flow prior to the application of drawing force thereto.

23. The method of forming a sheet of glass, which consists in delivering the glass which is to form the sheet along two separate paths confluently toward a common path of advance as a single stream, in giving internal support to the stream a suitable distance beneath its point of formation while again dividing the same into separately flowing layers, and in causing said layers to reunite and form a descending sheet area.

24. The method of treating a flow of glass and drawing a sheet therefrom, which consists in advancing molten glass downwardly from a furnace chamber as a wide and shallow stream, in cascading the stream during its descent over the opposite sides of horizontally extending flow impeding members which are positioned in the same vertical plane, one below the other, in progressively reducing the temperature of the superficial surface of the cascading flow towards its lower point, and in accelerating its movement of departure from the lower member by the application of drawing force, to thereby produce a drawn sheet area beneath said member.

25. In the making of sheet glass, the method which consists in causing molten glass to descend along the opposite sides of a horizontally extending slab of refractory material toward a point of confluence beneath said slab, in guiding the flow outward and downward in a forking fashion from about the center of its point of confluence, and thereafter convergently toward a line of free descent, and in progressively accelerating the said convergent movement of the glass and its free movement by the application of drawing force to thereby form a descending sheet area.

26. In an apparatus for producing sheet glass, a plurality of directing members, around which molten glass streams successively flow before they are drawn into sheet form.

27. In an apparatus for producing sheet glass, a plurality of directing members, spaced from one another, around which molten glass streams successively flow before they are drawn into sheet form.

28. In an apparatus for producing sheet glass, a plurality of directing members, positioned one above another, around which molten glass streams successively flow before they are drawn into sheet form.

29. In an apparatus for producing sheet glass, a plurality of directing members, around which molten glass streams successively flow before they are drawn into united sheet form, one of the members being formed of a heat resisting metal.

30. In an apparatus for producing sheet glass, a plurality of directing members, around which molten glass streams successively flow before they are drawn into united sheet form, one of the members being formed of a heat resisting metallic alloy.

31. In an apparatus for producing sheet glass, a plurality of directing members, around which the molten glass successively flows before it is drawn into sheet form, one of the members being formed of an alloy of nickel and tungsten.

32. In an apparatus for producing sheet glass, a pair of directing members, positioned one above another, around which molten glass streams successively flow before they are drawn into united sheet form, the lower member being formed of a heat resisting metal.

33. In an apparatus for producing sheet glass, a pair of directing members, positioned one above another, around which molten glass streams successively flow before they are drawn into united sheet form, the lower member being formed of a heat resisting metallic alloy.

34. In an apparatus for producing sheet glass, a pair of directing members, positioned one above another, around which the molten glass successively flows before it is drawn into sheet form, the lower member being formed of an alloy of nickel and tungsten.

35. In an apparatus for producing sheet glass, a pair of directing members, spaced one above the other, around which the molten glass successively flows before being drawn from the lower member in sheet form, the lower member having an upper edge for splitting the molten stream received 36. In an apparatus for producing sheet glass, a pair of directing members, spaced one above the other, around which molten glass streams successively flow before being drawn from the lower member in united sheet form, the lower member having an upper edge for splitting the molten stream received from the upper member, and a lower edge where the glass streams flowing around the member reunite to form the sheet, the side walls of the lower member, down which the molten glass flows, first diverging outwardly from the upper edge, and then converging inwardly to the lower edge.

37. In an apparatus for producing sheet glass, a pair of directing members, spaced one above the other, around which molten glass streams successively flow before being drawn from the lower member in united sheet form, the lower member having an upper edge for splitting the molten stream received from the upper member, and a lower edge where the glass streams flowing around the member reunite to form the sheet, the side walls of the lower member, down which the molten glass flows, first diverging outwardly at a relatively small angle from the upper edge, and then converging inwardly at a sharper angle to the lower edge.

38. In an apparatus for producing sheet glass, a plurality of directing members, spaced one above another, around which the molten glass flows before being drawn down in sheet form from the lowermost member, the glass uniting between said directing members.

39. In an apparatus for producing sheet glass, a plurality of directing members, spaced one above another, around which the molten glass flows before being drawn down in sheet form from the lowermost member, and means from which molten glass flows in a single stream onto the uppermost member, the said streams uniting between the directing members.

40. In an apparatus for producing sheet glass, a plurality of directing members, spaced one above another, around which the molten glass flows before being drawn down in sheet form from the lowermost member, means from which molten glass flows in a single stream onto the uppermost member, and means for controlling the temperature of the molten glass as it flows around the members, the said streams uniting between the directing members.

41. In an apparatus for producing sheet glass, a pair of directing members, positioned one above another, around which the molten glass successively flows before it is drawn away in sheet form, the said streams uniting between the directing members, and means for adjusting the two members with relation to one another.

42. In an apparatus for producing sheet glass, a pair of directing members, positioned one above another, around which the molten glass successively flows before it is drawn away in sheet form, means for supplying molten glass to the upper member, the said streams uniting between the directing members, and means for adjusting the members with relation to each other and to the supplying means.

Signed at Toledo, in the county of Lucas and State of Ohio, this 22nd day of February, 1924.

ENOCH T. FERNGREN.